3,663,650
SUBSTANTIALLY TRANSPARENT POLYDI-
METHYLSILOXANE - POLYALKYLMETH-
ACRYLATE COMPOSITIONS AND METH-
OD FOR MAKING SAME
Peter C. Juliano, Scotia, N.Y., assignor to
General Electric Company
No Drawing. Filed Dec. 28, 1970, Ser. No. 102,086
Int. Cl. C08g 47/10; C08f 29/50
U.S. Cl. 260—827
17 Claims

ABSTRACT OF THE DISCLOSURE

A method, and binary polydimethylsiloxane-polyalkylmethacrylate block copolymers made by such method are provided involving the use of certain dilithio aromatic initiators. The transparent binary polydimethylsiloxanepolyalkylmethacrylate block copolymers can be blended with clear polyalkylmethacrylate plastics to produce substantially transparent thermoplastic films, sheets and coatings having improved surface characteristics.

The present invention relates to substantially transparent block copolymers of polydimethylsiloxane-polyalkylmethacrylate, a method for making such materials and the employment of such materials in combination with polyalkylmethacrylates to produce substantially transparent plastic compositions having improved surface characteristics.

The acrylics have long been recognized for their versatility in molding applications, paints, floor waxes, etc. One of the important characteristics of polyalkylmethacrylates is transparency. It also has long been recognized that silicones can impart improved surface characteristics to various organic polymers, such as improved release properties, etc. Prior to the present invention, however, when silicones were incorporated in polyalkylmethacrylates, the transparency of the resulting polyalkylmethacrylate compositions were impaired.

The present invention, is based on the discovery that polydimethylsiloxane can be incorporated into polyalkylmethacrylates without effecting the transparency of the resulting composition when utilized in the form of certain binary block copolymers of polydimethylsiloxane-polyalkylmethacrylate, as described hereinafter.

There is provided by the present invention a method for making such binary block copolymers of polydimethylsiloxane-polyalkylmethacrylate, which comprises.

(a) Effecting the anionic polymerization of cyclopolydimethylsiloxane with a dilithio aromatic initiator, (b) Effecting reaction between the resulting lithium terminated polydimethylsiloxane of (a) and alkylmethacrylate.

(c) Recovering polydimethylsiloxane-polyalkylmethacrylate block copolymer from the resulting mixture of (b), where the dilithio aromatic initiator is the product of reaction of lithium metal and an aromatic compound free of enolizable hydrogen and having the structural unit, (1) 

where Z is a member selected from sulfur, oxygen, and =NR, R is a monovalent hydrocarbon radical, and the free valences of the carbon atom of said structural unit can be satisfied by aryl radicals, or can be part of a bridged structure in an aromatic fused ring system.

Included by R, are aryl radicals, such as phenyl, tolyl, xylyl, naphthyl, anthryl, etc.; alkyl radicals, such as methyl, ethyl, propyl, butyl, pentyl, etc. Included by the aryl radicals which can satisfy the free valences of the structural unit of Formula 1 are the aryl radicals included by R, and aryl substituted aliphatically unsaturated divalent organo radicals such as $C_6H_5$—CH=CH—;

$C_6H_5$—$C_6H_4$—CH=CH—

$C_{10}H_7$—CH=CH—, etc.

The dilithio initiators which can be employed in the practice of the method of the present invention can be made by effecting contact between lithium metal in the form of wire, chunks, or the like, with an aromatic compound free of enolizable hydrogen. For example, the aromatic compound can be contacted with the lithium metal in an ether solvent at temperatures between —50° C. to +150° C., utilizing the procedure shown by Hsieh et al., Pat. 3,410,836. Suitable solvents which can be employed are for example, diethylether, dioxane, tetrahydrofuran, etc. Among the aromatic compounds which can be employed are for example, aromatic ketones, for example, benzophenone, phenyl-1-naphthylketone, di-2-naphthylketone, di-4-tolylketone, etc. In addition to the aromatic ketones, aromatic thio ketones also can be employed which can be derived from the aforementioned aromatic ketones by standard techniques such as: thiobenzophenone, phenyl-1-naphthylthioketone, di-2-naphthylthioketone, etc.

In addition, Schiff bases derived from such aromatic ketones utilizing organic amines, for example, aryl amines such as aniline, o-toluidine, m-toluidine, p-toluidine, etc.; alkyl amines, for example, methylamine, ethylamine, propylamine etc., which can be made by standard procedures. In addition to the aforedescribed aromatic ketones, thio ketones and Schiff bases there also can be employed aromatic compounds free of enolizable hydrogen in the form of ketones forming a bridge in a fused ring system such as, 9-fluorenone, 2,3-diphenyl-1-indenone, 10,10-diphenyl-9-anthrone, etc.

Included by the cyclopolydimethylsiloxane which can be used in the practice of the invention, are hexamethylcyclotrisiloxane, octamethylcyclotetrasiloxane, etc. These cyclic siloxanes can be made by hydrolyzing dimethyldichlorosilane and separating the resulting dimethyl siloxane from the mixture. Some of the alkyl methacrylates which can be employed to produce the polydimethylsiloxane-polyalkylmethacrylate block polymers of the present invention, are for example, methylmethacrylate, ethylmethacrylate, butylmethacrylate, etc.

In order to provide substantially transparent polydimethylsiloxane-polyalkylmethacrylate block copolymers, which may be referred to hereinafter as "block copolymers," the block copolymers made by the above described method can be extracted with organic solvent during or after recovery. Experience has shown that homopolymerization of dimethylsiloxane can occur prior to the anionic polymerization of alkyl methacrylate. Extraction of such polydimethylsiloxane by standard techniques using a solvent for polydimethylsiloxane, and a non-solvent for block copolymer will provide for substantially transparent block copolymers. Unlike techniques shown by Morton Pat. 3,051,684, the method of the present invention does not generate polyalkylmethacrylate homopolymer which can interfere with the production of substantially transparent block copolymer.

The block copolymers of the present invention can comprise from about 5–90% by weight of polydimethylsiloxane blocks and correspondingly from about 10–95% by weight of polyalkylmethacrylate blocks. The block copolymers are plastic at about 40% polydimethylsiloxane or below, and rubbery above such range. The polydimethylsiloxane blocks can consist essentially of from about 3 to about 1,500, and preferably from about 3 to about 500 chemically combined dimethylsiloxy units. These polydimethylsiloxy blocks can be chain terminated on one end with a monovalent radical such as alkoxy, acetoxy, lithoxy, etc.

The polyalkylmethacrylate blocks can have from 1 to 10,000 chemically combined alkylmethacrylate units and preferably from 500 to 1500.

The block copolymers can be cast from various solvents such as chlorinated aliphatic hydrocarbons, for example, methylene chloride, ethylene dichloride, trichloroethylene, etc.; chlorinated aromatic hydrocarbons, such as dichlorobenzene, and aliphatic esters such as ethyl acetate, etc.

In determining transparency, the block copolymers are compared to polymethylmethacrylate, which has a transparency rating of about 94%, indicating its ability to transmit light compared to the transmission of light through a free light path as shown on a scaled light meter, calibrated to read light intensity. The block copolymers can be cast into sheets exhibiting transparencies of from 92% to 94%.

Blends of block copolymers with polyalkylmethacrylate plastics can provide substantially transparent coatings, films, and sheets. The block copolymers can be employed over wide proportions by weight in the resulting blends such as .1% to 99.9% by weight based on the weight of the blend. Experience has shown that optimum transparency of block copolymers polyalkylmethacrylate blends can be achieved if the average molecular weight of the polyalkylmethacrylate is substantially the same as the molecular weight of the polyalkylmethacrylate blocks of the block copolymer.

In particular instances, plastic polyalkylmethacrylate sheets can be cast from monomer-polymer sirups where the monomer constitutes the solvent. In such instances, up to about 1% by weight of block copolymer can be employed to produce substantially transparent sheets when the alkylmethacrylate monomer is cured insitu. Curing catalyst which can be employed for example, benzoyl peroxide, azo-bis-isobutyldinitrile, etc.

Included among the applications to which the above described blends of the block copolymers in combination with substantially transparent organic polymers can be employed, are for example, floor waxes, dentures, contact lenses, windows, paints, textile coatings, and various surface applications requiring the employment of substantially transparent plastic coating materials having improved surface characteristics.

In the practice of the invention, contact is effected in the presence of an aprotic solvent and under substantially anhydrous conditions, between the dilithio initiator and cyclopolydimethylsiloxane. There is added alkylmethacrylate to the resulting lithiated polydimethylsiloxane to produce block copolymer. Block copolymer can be precipitated by pouring the reaction mixture into a suitable medium such as methanol, aliphatic alkanes, etc. If desired, block copolymer can be precipitated directly into an extractive solvent to simultaneously effect removal of undesirable reaction byproducts, such as polydimethylsiloxane homopolymer. Aprotic solvents which can be employed to facilitate anionic polymerization in the practice of the invention, are any organic solvents which have no active protons capable of interfering with growing anionic polymerization centers. For example, benzene, toluene, xylene, tetrahydrofuran, etc., are suitable aprotic solvents. It has also been found expedient to employ certain Lewis base promotors, during the anionic polymerization of cyclopolysiloxane, such as hexamethylphosphortriamide, dimethylsulfone, dimethylsulfoxide, dimethylformamide, dimethylacetamide, tetramethylurea, mono-, di-, tri-, or tetraglymes, tertiary amines, tertiaryphosphines, to facilitate the addition of the alkylmethacrylate to the lithiated polydimethylsiloxane.

Experience has shown that contact between the initiator and the cyclopolydimethylsiloxane is preferably effected in an inert atmosphere, such as by the use of an inert gas for example, nitrogen, argon, etc., and at temperatures in the range of between about $-50°$ C. to $+50°$ C.

Although the amount of initiator which is utilized is not critical, it has been found that a proportion of from about $2 \times 10^{-5}$ to 1 mole of initiator, per mole of cyclopolydimethylsiloxane will provide for effective results. Polymerization of the cyclopolydimethylsiloxane can be effected over a period of from 2 hours or less to 24 hours or more, depending upon such factors as the temperature employed, type of initiator utilized, the concentration of reactants, level of promotor, etc. It has been found that optimum results can be achieved, if polymerization is continued until the intrinsic viscosity of the polydimethylsiloxane formed is within the range of between about 0.16 to about 0.33 dl./g. when measured in chloroform at $25°$ C.

Upon completion of the polymerization of the cyclopolydimethylsiloxane, alkylmethacrylate can be added to the mixture. Although the proportions of alkylmethacrylate to cyclopolydimethylsiloxane are not critical, it has been found that from about 2 to about 15 moles of alkylmethacrylate, per mole of cyclopolydimethylsiloxane utilized in the initial polymerization mixture will provide for satisfactory yield of substantially transparent block copolymer. The addition of the alkylmethacrylate also must be effected under substantially anhydrous conditions and under an inert atmosphere. Temperatures in the range of from about $-75°$ C. up to room temperature can be employed. Polymerization of the alkylmethacrylate on the lithiated polydimethylsiloxane can be effected between about 2 hours or less to about 10 hours or more.

Polymerization of alkylmethacrylate can be terminated by the addition of a suitable acidic material, such as an organic aliphatic acid, for example, acetic acid, which can be employed to neutralize the lithium ion. Block copolymer then can be precipitated from the reaction mixture by pouring the reaction mixture into an acidified aliphatic alcohol, such as methanol, or an aliphatic hydrocarbon, such as hexane, etc. Precipitation is preferably effected after the reaction mixture has been allowed to warm up to ambient temperatures. If desired, the precipitated product can then be dried under reduced pressure.

Experience has shown that the block copolymer is preferably extracted before it can be cast as a transparent film, or utilized in combination with polyalkylmethacrylate to produce substantially transparent blends. Extraction has been found to effect the removal of homopolymerized dimethylsiloxane which can be formed prior to the addition of methylmethacrylate in the production of the block copolymer. Depending upon when extraction is to be effected, a suitable solvent for polydimethylsiloxane can be employed in the block copolymers precipitation step, or subsequently after the block copolymer has been recovered and dried. In instances where a yield determination of block copolymer is desired, the dried block copolymer can be conveniently weighed and extracted to a constant weight percent of silicon by elemental analysis. Solvents which can be employed to extract block copolymers are any organic solvents in which polydimethylsiloxane is substantially soluble and polyalkylmethacrylate is substantially insoluble and include aliphatic hydrocarbons such as, hexane, heptane, cyclohexane, etc. The extraction allows gravity separation of the organic phase and can be achieved by standard procedures such as decantation, centrifuging, filtering, the employment of a Soxhlet apparatus, etc. Preferably, the solvent employed for extraction should have a boiling point below the glass transition temperature of the polyalkylmethacrylate.

In order that those skilled in the art will be better able to practice the invention, the following examples are given by way of illustration and not by way of limitation. All parts are by weight.

EXAMPLE 1

A substantially transparent polydimethylsiloxane-polymethylmethacrylate block copolymer containing about 34.1% dimethylsiloxy units by weight, was made as follows:

A dilithio initiator was made by stirring for 48 hours at 25° C., a mixture of 0.01 mole of benzophenone, 0.05 gram atoms of lithium metal in the form of wire in about 0.5 mole of tetrahydrofuran under substantially anhydrous conditions, and under an inert nitrogen atmosphere.

After the solution was cooled to 0° C., there was added $5 \times 10^{-4}$ mole of the above initiator to a solution of $4 \times 10^{-2}$ mole of hexamethylcyclotrisiloxane in 1.5 moles of anhydrous tetrahydrofuran. The mixture was stirred for 30–45 minutes effecting a color change from red-purple to orange-brown. There was then added $1 \times 10^{-3}$ mole of hexamethylphosphortriamide to the mixture which was maintained for 8 hours at a temperature of 0° C. The intrinsic viscosity of the mixture was found to be about 0.26 when measured in chloroform at 25° C., indicating the completion of the hexamethylcyclotrisiloxane polymerization. There was then added with stirring about 0.1 mole of methylmethacrylate to the mixture over a 10 minute period. The polymerization of the methylmethacrylate was allowed to continue for 2½ hours while the temperature was maintained at −40° C. There was then added an amount of acetic acid to the mixture sufficient to neutralize the lithium ions. The mixture was then allowed to warm to room temperature, and poured into about 20 moles of methanol to effect the precipitation of product. Based on method of preparation, the product consists essentially of about 51.6% by weight of polydimethylsiloxane, chemically combined with about 48.4% by weight of polymethylmethacrylate.

The above product was then extracted for 72 hours with hexane utilizing a Soxhlet extraction apparatus. There was obtained about a 76.6% yield of a substantially transparent polydimethylsiloxane—polymethylmethacrylate block copolymer containing about 34.1% by weight of polydimethylsiloxane blocks.

In addition to the above block copolymer (A) there also was made block copolymer (B) following the same procedure having about 20.1% polydimethylsiloxane by weight. An attempt also was made to make block copolymer (C) following the same procedure for block copolymer (A), except butyl lithium was substituted for the dilithiobenzophenone initiator. In addition, block copolymer (D) was made using the same ingredients employed to make block copolymer (A), except that the methylmethacrylate was anionically polymerized prior to the anionic polymerization of the hexamethylcyclotrisiloxane.

Block copolymer A, B, and D were then cast onto glass from 10% methylene chloride solutions to films having an average thickness of about 11 mils. A polymethylmethacrylate having a molecular weight of about 100,000 was also cast to the same thickness from methylene chloride. The various films were then measured for transparency utilizing a Zeiss GFL microscope with an attached Zeiss light meter. A collimated ¼ inch diameter light beam from a tungsten lamp was passed up through the hole in the specimen stage to the microscope objective having a lens diameter of less than ¼ inch and thereafter through the ocular to the photocell of the light meter. The light meter was calibrated to read 100 microamps when the light was on but without any sheet in the optical path, and 0 when the light was off.

Table I below shows the results obtained when O is a light free path showing 100% transmission, MMA is pure polymethylmethacrylate, showing 94% transmission.

TABLE I

| Sample | Percent transmission |
|---|---|
| O | 100 |
| MMA | 94 |
| A | 93.5 |
| B | 93.5 |
| D | 35 |

As shown above, block copolymers A and B made in accordance with the invention had substantially the same transparency as the polymethylmethacrylate film. It was not possible to make block copolymer C because the initiator employed did not have the structural unit of Formula 1. There was obtained only homopolymerized polydimethylsiloxane. As shown by Table I, block copolymer D did not possess the optical clarity of A and B.

Blends of the above-described polymethylmethacrylate and block copolymer (B) were prepared utilizing methylene chloride solvent over a weight percent range of from 0 to 100% block copolymer in the blend, to determine what effect the block copolymer had on the polymethylmethacrylate with respect to transparency. In addition, a blend was prepared of block copolymer (B) and a sirup of methylmethacrylate monomer and polymethylmethacrylate containing about 65% by weight of the monomer. The blend formed from the methylmethacrylate sirup was prepared by incorporating about 1% by weight of the blend of block copolymer (B), and thereafter curing the resulting blend with benzoyl peroxide. A film having a thickness of about 125 mils was obtained.

The following table shows transparency results using the same light transmission test shown in Table I. Polymethylmethacrylate is shown as 0 and the blend compositions are expressed as weight percent block copolymer (B) in the blend. With the exception of the film molded from the methacrylate sirup, all films were about 11 mils and cast from methylene chloride as described above. The films from the methacrylate sirup is shown as 1% copolymer.

TABLE II

| Block copolymer (wt. percent) | Percent transmission |
|---|---|
| 0 | 94 |
| 1 | 93 |
| 4 | 92.5 |
| 10 | 92 |
| 20 | 92.5 |
| 40 | 92 |
| 50 | 92.5 |
| 99 | 93 |

In order to demonstrate the improved surface properties of the above block copolymer in polymethylmethacrylate blends as compared to polymethylmethacrylate free of block copolymer, surface wettability of the blend was measured. In determining wettability, the contact angle was measured between a drop of water and the film surface using a protractor on an eye piece fitted to a low powered telescope. Contact angles were obtained with blends containing from $10^{-3}$ to 99% by weight of block copolymer (B), as compared to the polymethylmethacrylate films free of block copolymers, or "0%."

TABLE III

| Block copolymer (wt. percent) | Contact angle |
|---|---|
| 0 | 61 |
| $10^{-3}$ | 75 |
| $10^{-2}$ | 87 |
| $10^{-1}$ | 95 |
| 1 | 97 |
| 4 | 95 |
| 10 | 95 |

TABLE III—Continued

| Block copolymer (wt. percent) | Contact angle |
|---|---|
| 20 | 97 |
| 40 | 95 |
| 50 | 95 |
| 99 | 95 |

Based on the above results, those skilled in the art would know that the method of the present invention provides substantially transparent block copolymers. In addition, blends of such block copolymers and polymethylmethacrylates not only possess transparency, but exhibit improved surface characteristics.

EXAMPLE 2

The procedure of Example 1, is repeated except that in place of a dilithiobenzophenone initiator, there is employed an equal molar amount of dilithiothiobenzophenone initiator. The dilithio initiator is added to a mixture of hexamethylcyclotrisiloxane in tetrahydrofuran. After ½ hour of stirring under substantially anhydrous conditions, in a nitrogen atmosphere, the hexamethylphosphortriamide is added. The polymerization of hexamethylcyclotrisiloxane is allowed to take place.

Additional tetrahydrofuran is added to the mixture and the temperature is lowered to −45° C. There is then added methylmethacrylate with stirring. After about 2 hours acetic acid is added to quench the initiator and the mixture is allowed to warm up to room temperature. The mixture is then added to methanol to effect precipitation of product which is filtered and dried in an oven under vacuum to a constant weight. The product is then extracted with hexane. A block copolymer is obtained. A film is cast from methylene chloride. Its intrinsic viscosity is found to be about 0.66 dl./g. when measured in chloroform at 25° C. The weight of dimethylsiloxane is about 20%. An 11 mil film is measured for transparency and a reading of about 93.5 is obtained in accordance with the test of Example 1.

EXAMPLE 3

The procedure of Example 1 is repeated, except there is utilized about $5 \times 10^{-4}$ moles of dilithio benzophenone anil in place of the dilithio benzophenone. After 30 minutes, $1 \times 10^{-3}$ moles of hexamethylphosphortriamide is added. The polymerization of the hexamethylcyclotrisiloxane is continued for 4 hours while maintaining the temperature at 0° C. There is then added 0.95 moles of toluene to the mixture and the temperature is lowered to −45° C. There is added 0.188 moles of methylmethacrylate, while the mixture is stirred under a nitrogen atmosphere, and under substantially anhydrous conditions. After 2 hours of stirring, acetic acid is added in amounts to quench the dilithio initiator. The mixture is then allowed to warm up to room temperature. A quantitative yield of product is obtained after pouring the mixture in methanol and filtering the mixture. The product is extracted with heptane. There is obtained a polydimethylsiloxane - polymethylmethacrylate block copolymer having 21.7% by weight polydimethylsiloxane and an intrinsic viscosity of 0.66 dl./g. in chloroform. A film cast from a solution of the block copolymer in ethylenedichloride is found to be optically clear.

EXAMPLE 4

There was added $5 \times 10^{-4}$ moles of dilithio fluorenone to a stirred mixture at 0° C. of $4.5 \times 10^{-2}$ moles of hexamethylcyclotrisiloxane in 0.5 moles of tetrahydrofuran. The color of the mixture changed from green to red. To this solution was added $1 \times 10^{-3}$ moles of hexamethylphosphortriamide and the color changed to a deeper red. The polymerization of the hexamethylcyclotrisiloxane was carried out for 4 hours at 0° C. Another $2.9 \times 10^{-2}$ moles of hexamethylphosphortriamide was added along with 0.94 moles of toluene and the temperature was lowered to −45° C. There was recovered an 82% yield of block copolymer when the product was extracted as described in Example 2. The block copolymer when measured in accordance with the procedure of Example 1.

Although the above examples are limited to the preparation of only a very few block copolymers of the present invention, it should be understood that the present invention is directed to the production of a much broader class of block copolymers utilizing dilithio initiators having the characteristic unit of Formula 1.

What I claim as new and desire to secure by Letters Patent of the United States is:

1. A method for making substantially transparent polydimethylsiloxane-polyalkylmethacrylate block copolymer involving the steps of (1) effecting the anionic polymerization of cyclopolydimethylsiloxane with a dilithio aromatic initiator, (2) contacting the resulting metallated polydimethylsiloxane with monomeric alkylmethacrylate to produce a polydimethylsiloxane-polyalkylmethacrylate block copolymer (3) treating the block copolymer of (2) with an organic solvent in which polydimethylsiloxane is substantially soluble and in which polyalkylmethacrylate is substantially insoluble, and (4) recovering the resulting extracted block copolymer of step (3), where the dilithio aromatic initiator is made by reacting lithium metal and an aromatic compound free of enolizable hydrogen and having the unit structure,

where Z is a member selected from oxygen, sulfur, and =NR, R is a monovalent hydrocarbon radical and unsatisfied valences of the carbon atom of said unit structure can be satisfied by aryl radicals, or said carbon atom can be part of abridged structure in an aromatic fused ring system.

2. The method of claim 1 wherein the dilithio initiator is dilithio benzophenone.

3. The method of claim 1 where the dilithio initiator is dilithio thiobenzophenone.

4. The method of claim 1 where the dilithio initiator is dilithio benzophenone anil.

5. The method of claim 1 where the dilithio initiator is 9-fluorenone.

6. The method of claim 1 where the alkylmethacrylate is methylmethacrylate.

7. The method of claim 1 where the cyclopolydimethylsiloxane is hexamethylcyclotrisiloxane.

8. Substantially transparent film consisting essentially of polydimethylsiloxane-polyalkylmethacrylate block copolymer.

9. A substantially transparent film in accordance with claim 8, consisting essentially of polydimethylsiloxane-polymethylmethacrylate block copolymer.

10. Substantially transparent films in accordance with claim 8, consisting essentially of block copolymers having from 10 to about 90% by weight of polydimethylsiloxane blocks and correspondingly from about 10 to about 90% by weight of polyalkylmethacrylate blocks.

11. A substantially transparent blend of polyalkylmethacrylate and polydimethylsiloxane-polyalkylmethacrylate block copolymer.

12. A substantially transparent film cast from the composition of claim 11.

13. A blend in accordance with claim 11 which is made by using a sirup of methylmethacrylate and polymethylmethacrylate.

14. A blend in accordance with claim 13 having up to about 1% by weight of the block copolymer.

15. A blend in accordance with claim 11, having block copolymer with from about 20 to 34% by weight of polydimethylsiloxane.

16. A blend in accordance with claim 13 having 1% by weight of the block copolymer of claim 15 and a methylmethacrylate-polymethylmethacrylate sirup.

17. A substantially transparent film cast from the block of claim 16.

References Cited

UNITED STATES PATENTS 3,483,270  12/1969  Bostick _____ 260—827
3,051,684  8/1962  Morton et al. _____ 260—827

FOREIGN PATENTS 1,915,789  10/1969  Germany _____ 260—827

SAMUEL H. BLECH, Primary Examiner

U.S. Cl. X.R.

260—33.8 SB, 46.5 R